United States Patent [19]

Yang et al.

[11] Patent Number: 4,918,123

[45] Date of Patent: Apr. 17, 1990

[54] INVERSE EMULSION PROCESS FOR PREPARING HYDROPHOBE-CONTAINING POLYMERS

[75] Inventors: Henry W. Yang, Kingwood; Thomas J. Pacansky, Houston, both of Tex.

[73] Assignee: Exxon Chemical Patents, Inc., Linden, N.J.

[21] Appl. No.: 194,800

[22] Filed: May 17, 1988

[51] Int. Cl.$^4$ .................. C08L 5/10; C08L 33/14; C08L 39/00

[52] U.S. Cl. .................. 524/110; 524/389; 524/457; 524/502; 524/753; 524/760; 524/801; 524/815

[58] Field of Search .............. 524/457, 801, 759, 110, 524/389, 753, 760, 815

Primary Examiner—C. Warren Ivy
Attorney, Agent, or Firm—R. L. Graham; J. F. Hunt

[57] ABSTRACT

High solids content, high molecular weight hydrophobe-containing cationic polymer products are prepared by an inverse (water-in-oil) emulsion process wherein the hydrophobic monomer is in the water phase. The resultant polymers have increased activity in oily water clean-up.

24 Claims, No Drawings

INVERSE EMULSION PROCESS FOR PREPARING HYDROPHOBE-CONTAINING POLYMERS

BACKGROUND OF THE INVENTION

1. Field of the Invention

This invention provides a process for preparing water-soluble hydrophobe-containing polymers by a modified inverse polymerization technique. These polymers which will generally also contain cationic functionality to increase their use in oily water clean-up, contain both water soluble monomers and water insoluble monomers. Preferably, the water soluble monomers are acrylamide (AM) and a salt of an unsaturated amine base (C) and the water insoluble monomer is a higher alkyl(meth)acrylamide or alkyl(meth)acrylate (R). These polymers will hereafter be referred to as C-RAM. The process for their preparation relies on placing the water insoluble hydrophobic monomer in the aqueous phase of an inverse, i.e. water-in-oil, emulsion and conducting the entire polymerization in that aqueous phase. Redox, azo, peroxide or other water soluble free radical initiators are used to copolymerize both the water soluble and hydrophobic monomers, forming copolymers of ethylenically unsaturated amine base salts, alkyl(meth)acrylamides or alkyl(meth)acrylates, and acrylamide. These polymers provide exceptional clean-up of waste waters containing organic contaminants. Also they are very effective for resolving oil-in-water emulsions, such as those found in oil production.

2. Description of the Prior Art

The production of waste water clean enough for safe disposal continues to be a problem, especially when oil is emulsified in the primary waste water. In oil production, especially where high levels of water flooding or steam flooding are being practiced, oil-in-water emulsions are generated. Other oil-in-water emulsions of concern in the waste water treating area are those produced as a result of steel mill and metal working operations, food processing, refinery and chemical plant operation, cooling water blow-down, bitumen extraction from tar sands and shale oil operations, rain water run-off and a host of others. These emulsions all have in common the fact that the oil or organic phase is insoluble in the water continuous phase. The amount of oil dispersed in these water continuous emulsions varies from a few to several hundred parts per million, in waste waters, to several percent (5 to 25% or more) in fluids right out of the wellhead.

The oil is generally well dispersed in the water phase as very small droplets that are stabilized as a result of the presence of natural surfactants. The stability of these oil-in-water emulsions generally results from either a negative charge imparted to the droplets by these surfactants, or from steric stabilization caused by surfactants, or by shear which the fluid experiences during production, which causes the generation of smaller and more stable droplets, or from several other sources.

Various chemicals, surfactants and polymers are generally applied to these waters to enhance the separation of oil and water. These chemicals are used to aid in foam generation in flotation. In addition they may be used to cause oil droplet surface charge neutralization, which results in destabilization of the oil-in-water emulsion. The destabilization results in agglomeration of the oil droplets, floc formation and, possibly, several other beneficial effects. While the use of such chemicals generally enhances the separation of oil from oil-in-water emulsions, there remains significant room for improvement. The type of water soluble polymers currently used are generally acrylamide copolymers or melamine/formaldehyde polymers or others. For example, Bolhofner, in U.S. Pat. No. 4,472,284, describes the treatment of water containing fats, oils and greases using a melamine-formaldehyde condensation product, alone or in combination with a polyacrylamide. Rather high polymer concentrations are needed and a two polymer system can present handling difficulties during field operations.

Another approah to the treatment of waste water involves the use of water insoluble polymeric adsorbents, as described by Renner in U.S. Pat. No. 3,716,483, or Takegani et al. in U.S. Pat. No. 4,081,403. These processes for treating waste water are costly and cannot achieve the degree of clean-up of the polymers produced by the process of the present invention.

Another approach involves the use of copolymers of acrylamide with various cationic monomers of various comonomer ratios. Some of the cationic monomers that have been used are: methacrylamidoalkyltrimethylammonium salts, such as methacrylamidopropyltrimethylammonium chloride (MAPTAC), as described in U.S. Pat. No. 4,160,742, or similar acrylate esters; diallyl dialkyl ammoniumm salts, as described by Booth and Linke in U.S. Pat. Nos. 3,147,218 and 3,316,181; salts of dimethylaminoethylmethacrylate and the like. Buris et al., U.S. Pat. No. 4,224,150, describe a process for clarifying aqueous systems employing quaternary ammonium adducts of polymerizable tertiary ammonium salts and acrylamide. These polymers are generally available as high molecular weight materials, either in aqueous solution, as emulsions of various types, or in solid form, which requires dissolution before use.

The use of hydrophobic groups on water soluble polymers to enhance the rheological properties of water based fluids has been described. One approach to provide polyacrylamide based systems containing hydrophobic groups is described by Bock et al., U.S. Pat. No. 4,520,182. Water soluble acrylamide copolymers containing a small amount of oil soluble or hydrophobic alkyl acrylamide groups were found to impart efficient viscosification to aqueous fluids. Landoll, U.S. Pat. No. 4,304,902, describes copolymers of ethylene oxide with long chain epoxides which also required relatively large polymer concentrations (approximately 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification by a water soluble polymer containing hydrophobic groups is described by Evani, U.S. Pat. No. ,4,432,881. The need for a surfactant to achieve solubility and thickening efficiency should make such a system very salt sensitive, as well as very sensitive to small changes in surfactant and polymer concentration. Emmons et al., U.S. Pat. No. 4,395,524, teaches acrylamide copolymers as thickeners for aqueous systems. While these polymers possess hydrophobic groups, they do not contain the cationic monomers disclosed in this invention and are not effective in treating oil-in-water emulsions or viscosifying water-based fluids.

One of the objects of this invention is to overcome the deficiencies in the use of the water soluble polymers of the prior art for treating oily waste water and resolving oil-in-water emulsions. A new class of water soluble polymers, described in copending application U.S. Ser. No. 904,548, filed Sept. 8, 1986 (now abandoned) and continuation U.S. Ser. No. 054,382, filed May 26, 1987 now U.S. Pat. No. 4,835,234, can be used at a lower treat rate and hence is more efficient than prior art materials for oily water treatment. Furthermore, these novel terpolymers provide a superior degree of clean-up or oil removal in comparison to the prior art materials. These new polymers contain a nonionic water soluble monomer, such as acrylamide, a cationically charged, water soluble, ethylenically unsaturated amine-based monomer, such as 3-methacrylamidopropyltrimethylammonium chloride (MAPTAC), and a water insoluble or hydrophobic monomer, such as an alkyl(meth)acrylamide or alkyl(meth)acrylate with a chain length of 4 carbons or greater.

When these polymers are placed in an aqueous solvent, the hydrophobic groups aggregate or associate in a manner similar to a surfactant. If oil droplets are present in an aqueous solution there is an attractive interaction between the hydrophobic groups and the hydrophobic oil droplets. We have found that the presence of cationic groups, such as 3-methacrylamidopropyltrimethylammonium chloride (MAPTAC) causes an expansion of the polymer in solution, an improvement in polymer solubility, and an enhancement of the attractive interaction between the polymer chains and the oil droplets which normally have negative surface charges. The synergism between the cationic and hydrophobic groups in terms of oily water treatment or breaking of oil-in-water emulsions sets these polymers apart from those of the prior art.

Synthesis of polymers containing both hydrophobic and hydrophillic functionality presents difficulties. In order for polymerization to be effected, the monomers must obviously come into close proximity to one another. The incompatibility of the oil soluble and water soluble monomers in water, as the solvent, prevents an effective concentration of one or the other of these monomeric species from being achieved at the locus of polymerization of the other comonomer. Several processes described in the prior art could conceivably achieve this, but have serious deficiencies, necessitating this invention. For example, simply dispersing the water insoluble monomer as fine particles in the aqueous medium containing dissolved water soluble monomers would result in low incorporation of the water insoluble monomer and would lead to a heterogeneous product of particles dispersed in a predominantly water soluble polymer. The resulting polymer could not be used to impart efficient and uniform thickening to water based fluids, nor be very effective in treating oily water.

Techniques for polymerizing water soluble polymers, such as those taught in U.S. Pat. No. 4,154,190, 3,211,708, 3,002,960 and 3,284,393, cannot be used to prepare the compositions of this invention. Also, techniques or processes for preparing cationic polymers or copolymers containing cationic monomers, such as U.S. Pat. Nos. 4,452,957, 4,283,517, 4,160,742 and 3,316,181, have deficiencies in terms of incorporating the hydrophobic monomers needed for the polymers of this invention. This art does not teach the formation of a sufficiently fine dispersion of the water and oil soluble monomers to enable uniform reaction and homogeneous terpolymers to be produced. The use of mutual solvents or solvent mixtures to dissolve the water and oil soluble monomers, as taught by Lenke et al., U.S. Pat. No. 4,098,987, has some serious limitations. Although this approach undoubtedly allows the incompatible monomers to come into close proximity to one another, since the dispersion is on a molecular scale, often the resulting copolymer is insoluble in the same solvent, as shown in U.S. Pat. No. 4,151,333. This leads to precipitation of the copolymer before it has achieved sufficient molecular weight to provide effective oily water treatment. The nonionic polymeric surfactants taught in U.S. Pat. No. 4,098,987 possess extremely low molecular weight (less than 10,000 amu) and lack the cationic functionality necessary for the present polymers. Thus, these teachings provide polymers which do not provide the extent or efficiency of oily water clean-up or breaking of oil-in-water emulsions. A major objective of this invention is to teach a process for preparing water dispersible or water soluble polymers containing both hydrophobic and cationic functionality. A further objective is to provide a process for producing these polymers for treatment of oily water.

Two techniques have been found most useful for preparing hydrophobically associating copolymers of acrylamide and alkylacrylamides. The first method was based on the use of a water continuous microemulsion to disperse the oil soluble monomer in a solution of the water soluble monomers. Details of the procedures and techniques are taught by Turner et al., U.S. Pat. No. 4,521,580. A second method for preparing copolymers of acrylamide and alkylacrylamide was based on dispersing the oil soluble monomer using low HLB surfactants to form an aqueous micellar solution which contains the water soluble monomers. Suitable surfactants and the details of the polymerization are taught by Turner et al., U.S. Pat. No. 4,528,348. While either the microemulsion or micellar polymerization techniques can be used to prepare hydrophobically associating polymers containing a variety of water soluble nonionic monomers, a problem arises when the monomers have a strong interaction with the surfactants used in the polymerization. In particular, strong ionic interactions or complexes can be formed between cationic water soluble monomers, such as ethylenically unsaturated amine based monomers, and anionic surfactants, such as alkyl sulfates and sulfonates.

A third technique which also has been found useful for preparing hydrophobically associating copolymers of acrylamide and alkylacrylamides is based upon a solution polymerization technique. The solution polymerization utilizes mutual solvents, i.e. alcohols or acetone, with water to provide effective copolymerization of water soluble and water insoluble monomers. The resultant polymeric solutions are generally of very low molecular weight due to the large amounts of solvent used since the solvent acts as a chain transfer agent during polymerization. Low molecular weight products are not effective in cleaning up oily water.

All three of the techniques suffer the same low total solids content, typically less than 10 weight percent to be flowable in the reactor.

A process is described in this application which overcomes the described problems. The present invention teaches the use of a modified water-in-oil emulsion polymerization technique to provide effective copolymerization of water soluble and water insoluble monomers. The modified technique entails incorporating the water insoluble monomers into the aqueous phase along with the water soluble monomers and then utilizing a novel surfactant system to maintain the stability of the water-in-oil emulsion during the subsequent polymerization which is conducted solely in the aqueous phase.

SUMMARY OF THE INVENTION

A process is described for producing unique and novel, preferably cation-containing, polymers of water soluble monomers with water insoluble monomers which polymers are particularly useful for clean-up of waste waters containing organic contaminants. The process relies on the dissolution of the water insoluble monomer(s) into an aqueous solution of at least one of the water soluble monomers by means of a water miscible oil immiscible cosolvent and/or a heating technique, followed by the use of a novel surfactant combination of a conventional low HLB surfactant and a particular polymeric stabilizer. The type and concentration of miscible solvents are chosen to produce a clear, uniform, homogeneous aqueous solution which serves as the aqueous phase of the water-in-oil emulsion. The heating technique is utilized to maintain the water insoluble monomer in the solution so that true copolymers are formed. In addition, by use of both the water miscible solvent and the heating technique, the water insoluble monomer remain dispersed in the aqueous phase so that the polymerization is effected without the substantial formation of particulates of water insoluble polymer.

DETAILED DESCRIPTION OF THE INVENTION

The inverse, water-in-oil, emulsion polymerization process of this invention comprises the steps of (i) forming a uniform solution of a water-insoluble oil-soluble monomer, a nonionic water soluble monomer (such as acrylamide), and preferably a cationic monomer (such as MAPTAC) using a minor amount of a water miscible oil immiscible solvent (such as methanol or isopropanol) and a major amount of water; (ii) forming an oil phase by adding low HLB surfactant and a steric stabilizer to one or more inert hydrophobic liquids (such as a mineral oil); (iii) homogenizing the aqueous solution and the oil phase to form a water-in-oil emulsion; (iv) deaerating the emulsion system; (v) adding sufficient water soluble free radical initiator to effect the polymerization; and (vi) polymerizing for a sufficient period of time at a sufficient temperature to produce a high molecular weight copolymer at a high solids level. The resulting polymeric emulsion may be formed into a single package product by the addition of breaker surfactant.

The present invention describes the polymerization of a nonionic, water soluble, ethylenically unsaturated monomer, such as acrylamide; a water soluble, cationic monomer from the group consisting of ammoniumalkyl(meth)acrylamides, ammoniumalkyl(meth)acrylates and diallyl dialkyl ammonium salts; and a water insoluble monomer, such as an N-alkyl(meth)acrylamide or alkyl(meth)acrylate. The process for synthesizing these polymers relies on solubilizing the water insoluble monomer into an aqueous monomer solution which will form the aqueous phase of a water-in-oil emulsion. This is accomplished by (i) using a suitable water-miscible, oil-immiscible organic solvent, such as a short chain alcohol, or (ii) heating a normally solid water insoluble monomer in the presence of the nonionic monomer and water to above its melting point and thereafter maintaining the temperature at no lower than about 15° C. below the melting point, or (iii) using a reduced amount of the water-miscible oil-immiscible solvent in combination with the heating technique. As a result, the water insoluble monomer is incorporated into the aqueous phase and polymerization can be initiated by water soluble initiators in the absence of oil soluble initiators to yield extremely high molecular weight polymers in high concentration with essentially no visible water-insoluble particulates.

Suitable water-miscible, oil-immiscible solvents for use herein include the lower alcohols which generally contain about 1 to 4 carbon atoms. Such alcohols include methanol, ethanol, propanol, isopropanol, butanol, isobutanol, and t-butanol. The preferred alcohol solvents are methanol and isopropanol. Most preferably the solvent is methanol. The solvent is generally used in an amount of about 0.75 to 5 times the weight of the water insoluble monomer(s), preferably about 1 to 3 times. If the amount of solvent is substantially above 5 times the water insoluble monomer, then the resultant polymer may be of too low a molecular weight due to the chain transfer effect of the solvent. If the amount of solvent is greatly below about that of the water insoluble monomer, then the water insoluble monomer is prone to separation from the other components in the aqueous phase which leads to unsatisfactory emulsion stability and/or unsatisfactory polymer performances. Another factor to be considered in determining the amount of solvent to be used is the temperature at which the water-insoluble monomer is mixed with the solvent and with the water soluble monomers. The higher the temperature, the lower the amount of solvent needed, and thus the higher the molecular weight of the resultant polymer. Thus the temperature may range from about 20° to about 100° C. Preferably the temperature will be about 40° to about 75° C. If the temperature is sufficiently high then the solvent may be omitted altogether. If the water insoluble monomer is normally a solid at room temperature, then it may be incorporated into the soluble monomer/water solution by heating to above its melting point and thereafter maintaining the temperature at no lower than about 15° C. below the melting point. Further details of this method are disclosed in U.S. Ser. No. 195,060, filed May 17, 1988, incorporated herein by reference.

Preferably the water insoluble monomer is incorporated into the aqueous phase by a combination of a solvent and heating as this has been found to produce the most satisfactory product. In this case, the solvent will be used in an amount of about 50 to about 100 weight percent of the insoluble monomer and the temperature is greater than the melting point of the monomer and will be at least about 50° C. In this case the solvent content is balanced versus the temperature to keep the water insoluble monomer dissolved in the aqueous phase and to obtain a high molecular weight polymer.

The oil phase of the water-in-oil emulsion will be comprised of a conventional inert hydrophobic liquid which is immiscible with water together with a two component stabilizer system. The stabilizer system is a combination of a conventional low HLB surfactant used for water-in-oil emulsion polymerizations and a polymeric stabilizer. The conventional stabilizer will have an HLB value of about 1 to 5 and will generally be used in an amount of about 2 to 8 weight percent, based upon the total weight of the water-in-oil emulsion. Examples of suitable conventional stabilizers include the sorbitan esters and alkyl phenols optionally containing pendant ethylene oxide chains. The polymeric stabilizer is an oil-soluble water-insoluble linear ABA block copolymer of polyester-polyethylene oxide-polyester prepared by reacting condensed 12-hydroxystearic acid with polyethylenne oxide according to the procedure outlined in U.S. Pat. No. 4,203,877. These materials are available as Hypermer B246, B261, and others from Imperial Chemical Industries Ltd. The block copolymers have HLB values of about 5-9 depending on the size of the ethylene oxide chain and will be used in an amount of about 0.5 to about 5 weight percent based upon the total weight of the emulsion, preferably about 0.8 to about 2 weight percent. The conventional low HLB surfactant and the block copolymer polymeric surfactant will generally be used in proportions ranging from about 1:1 to about 5:1 as this range has been found to produce the most satisfactory final polymer emulsion.

To ensure that no water insoluble monomer is polymerized in the oil phase, only water soluble initiators are utilized and preferably a radical scavenger is incorporated into the oil phase either prior to forming the initial water-in-oil emulsion, or more preferably shortly after polymerization has been commenced. Examples of oil soluble radical scavengers include benzoquinone, chloranil, pentaphenylethane, carbon tetrachloride, and carbon tetrabromide. Such scavengers are generally used in amounts of about 0.01 to 0.5 weight percent of the oil phase, preferably about 0.05 to about 0.2 weight percent.

Although the present invention has been found to be independent of the particular emulsion polymerization method employed, except for the specific features mentioned above, certain preferences are delineated in the general description of emulsion polymerization which follows.

A preliminary emulsion is made by homogenizing oil and aqueous phases. The oil phase of the emulsion, which generally comprises from about 5 to 40 percent by weight of the emulsion, is comprised of one or more inert hydrophobic liquids. Preferably, the oil phase comprises from about 20 to 30 percent of the emulsion. The oil used may be selected from a large class of organic liquids which are immuscible with water, including liquid hydrocarbons and substituted liquid hydrocarbons. As representative examples there may be mentioned benzene, xylene, toluene, mineral oils, kerosenes, napthas, chlorinated hydrocarbons, such as perchloroethylene, and the like. The oil phase also contains the stabilizer system and the oil soluble radical scavenger as described above.

The aqueous phase generally comprises from about 95 to 60 percent, by weight of the emulsion. Preferably, it comprises from about 80 to 70 percent thereof. In addition to the water, the aqueous phase contains the desired monomers to be polymerized, in an amount equal to from about 20 to 40% by weight based on the total weight of the emulsion, and generally a chain transfer agent and an initiator. Alternatively, the chain transfer agent and/or the initiator may be added to the system after the preliminary emulsion has been prepared. The initiator may also be added continuously during polymerization to control the rate of polymerization depending upon the particular monomers used and their reactivity.

Any conventional chain transfer agent may be employed, such as propylene glycol, isopropanol, 2-mercaptoethanol, dodecyl mercaptan and thioglycolic acid. The chain transfer agent is generally present in an amount equal to from about 0.1 to 10.0 percent by weight based on the total emulsion weight. However, more of the chain transfer agent may be added.

The initiator may be any water soluble, oil insoluble free radical producing material well known in the art. The preferred free radical initiators are the peroxide-type polymerization initiators and the azo-type polymerization initiators. Generally the amount of initiator utilized is from about 0.0005 to 0.5 percent by weight, based upon the total emulsion weight.

A sequestering agent may also be present in the aqueous phase. Although the preferred sequestering agent is ethylenediamine tetraacetic acid (EDTA), other sequestering agents, such as pentasodium diethylenetriamine pentaacetate (DTPA), may be employed. Usually from about 0.01 to 2.0 percent by weight of the emulsion, of the sequestering agent is added, although more may be used.

Following preparation of the preliminary emulsion, polymerization of the monomers is commenced at a temperature sufficiently high to break down the initiator to produce the desired free radicals. General a suitable range of temperatures is about 20° C. to 200° C., with preferred temperatures about 40° C. to 100° C.

Preferably the polymerization is run at pH of about 2-12, and a suitable amount of ammonia or other base, or acid, may be added to the preliminary emulsion to achieve the desired pH. The polymerization is usually completed in from about several hours to several days depending upon the monomers employed and other reaction variables. It is generally carried out at atmospheric pressure.

Following completion of the polymerization, the pH of the emulsion may be adjusted as desired. For the water soluble hydrophobically associating polymers, this is typically about 3-7. A breaker surfactant may also be added to yield a single package final product. Any suitable breaker surfactant may be employed, experimentation being the best means of determining which breaker surfactant will perform optimally with a given emulsion system. A preferred breaker surfactant is a compound prepared by reacting ethylene oxide with nonyl phenol. Typically, the breaker surfactant is added in an amount equal to from about 0.5 to 5.0 percent by weight, based on the total emulsion weight. Preferably, from about 1.5 to 3.5 percent of the breaker surfactant is added.

Once prepared, the emulsions of the present invention may be chemically modified in any known manner. The term chemically modified is intended to cover further treatment of the dispersed water-soluble polymer and/or the addition of components to the dispersed water-soluble polymer which, without the stabilization provided by the two component stabilizer system of the present invention, would cause the normally water-soluble polymeric particles to coagulate or agglomerate. Examples of such further treatments are disclosed in U.S. Pat. Nos. 4,052,353 and 4,171,296, incorporated herein by reference. The emulsion of the present invention may also be concentrated in any suitable manner, such as is disclosed in U.S. Pat. No. 4,021,399, incorporated herein by reference.

The water soluble hydrophobically associating polymers which can be prepared by the process of the instant invention are characterized by the formula:

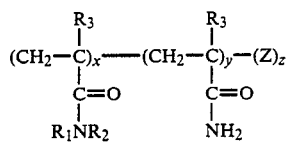

wherein $R_1$ is preferably a $C_4$ to $C_{30}$ linear or branched alkyl, alkylcycloalkyl or alkylaryl group, more preferable $C_6$ to $C_{22}$, and most preferably $C_6$ to $C_{18}$; and $R_2$ is the same or different group as $R_1$, or hydrogen or $C_1$ to $C_3$ linear or branched alkyl group; and $R_3$ is hydrogen or methyl; and Z is an ammonium cation monomer. The cationic monomer is selected from the group consisting of ammoniumalkyl(meth)acrylamides, ammoniumalkyl(meth)acrylates and diallyl dialkyl ammonium salts. The anion may be chloride, bromide or methyl or hydrogen sulfate. Typical, but not limiting, ranges of composition of the terpolymer are represented preferably by x equal to 0.1 to 20 mole percent, more preferably 0.2 to 10 mole percent and most preferably 0.2 to 5 mole percent. The mole percentage of acrylamide, y, is preferably 0 to 94.9, more preferably 10 to 94.8 and most preferably 25 to 94.8. The mole percentage of the cationic monomer, z, is preferably 5 to 99.9, preferably 5 to 80, most preferably 5 to 70.

The process of the present invention can also provide polymers exemplified by the following formula:

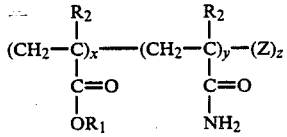

wherein $R_1$ is preferably a $C_4$ to $C_{30}$ linear or branched alkyl, alkylcycloalkyl or alkylaryl group, more preferably $C_6$ to $C_{22}$, and most preferably $C_6$ to $C_{18}$; $R_2$ is hydrogen or methyl; and Z is an ammonium cationic monomer. The cationic monomer is selected from the group consisting of ammoniumalkyl(meth)acrylamides, ammoniumalkyl(meth)acrylates and diallyl dialkyl ammonium salts. The anion may be chloride, bromide or methyl or hydrogen sulfate. Typical, but not limiting, ranges of composition of the terpolymer are represented preferably by x equal to 0.1 to 20 mole percent, more preferably 0.2 to 10 mole percent and most preferably 0.2 to 5 mole percent. The mole percentage of acrylamide, y, is preferably 0 to 94.9, more preferably 10 to 94.8 and most preferably 25 to 94.8. The mole percentage of the cationic monomer, z, is preferably 5 to 99.9, more preferably 5 to 80, most preferably 5 to 70.

The process of the present invention can also provide polymers exemplified by the following formula:

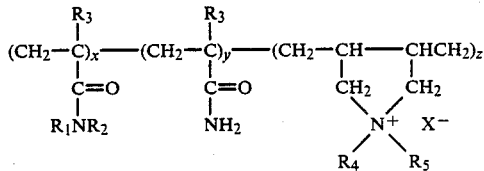

wherein $R_1$ is preferably a $C_4$ to $C_{30}$ linear or branched alkyl, alkylcycloalkyl or alkylaryl group, more preferably $C_6$ to $C_{22}$, and most preferably $C_6$ to $C_{18}$; $R_2$ is the same or different group as $R_1$, or hydrogen or $C_1$ to $C_3$ linear or branched alkyl group; $R_3$ is hydrogen or methyl; $R_4$ and $R_5$ can be hydrogen, a $C_1$ to $C_6$ linear or branched alkyl group, or a $C_5$ to $C_8$ cycloalkyl, aromatic or alkylaromatic group; and $X^-$ is an anion such as chloride, bromide or ethyl sulfate. Typical, but not limiting, ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 8 to 80, most preferably 5 to 70.

The process of the present invention can also provide polymers examplified by the following formula:

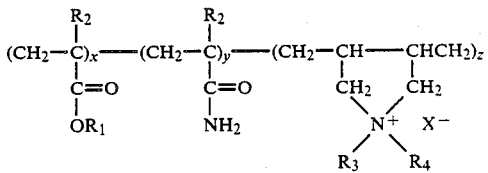

wherein $R_1$ is preferably a $C_4$ to $C_{30}$ linear or branched alkyl, alkylcycloalkyl or alkylaryl group, more preferably $C_6$ to $C_{22}$, and most preferably $C_6$ to $C_{18}$; $R_2$ is hydrogen or methyl; $R_3$ and $R_4$ can be hydrogen, a $C_1$ to $C_6$ linear or branched alkyl group, or a $C_5$ to $C_8$ cycloalkyl, aromatic or alkylaromatic group; and $X^-$ is an anion such as chloride, bromide or methyl or hydrogen sulfate. Typical, but not limiting, ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 5 to 80, most preferably 5 to 70.

Molecular weight of the polymer is also an important parameter which can be controlled by the polymerization process conditions of this invention. High molecular weight polymers incorporating both cationically charged ammonium groups and hydrophobic groups can be prepared by using high monomer concentrations under conditions which provide low effective radical concentration. For example, reducing the reaction temperature or the concentration of initiator will, in general, reduce the radical concentration and result in higher polymer molecular weights. In addition, the solvent and its concentration will influence the polymer molecular weight. The reduction of molecular weight upon increasing alcohol cosolvent concentration can be compensated for by increasing the monomer concentration and the hydrophobe content. Increased molecular weight will improve solution rheological properties and oily water treatment performance. All other things being equal, the higher the molecular weight the less soluble the polymer. Thus, as molecular weight is increased the amount of hydrophobic groups should be reduced and the amount of cationic groups increased. The presence of the alcohol in the polymerization system also reduces solution viscosity, providing a more easily handled or diluted product.

The primary advantage of the polymers disclosed here over polymers currently used is the discovery that the presence of a hydrophobic group on the water soluble polymer results in a significant improvement in the breaking of reverse emulsions and the removal of emulsified or dispersed oil from waste waters. By way of example, oil droplets emulsified in water generally carry a negative surface charge or zeta potential which helps to stabilize the emulsion, keeping the droplets dispersed and making them difficult to resolve or break. Cationic polymers or surfactants are used to neutralize the surface charge. Once the charge is neutral, the droplets may begin to approach each other and agglomerate or coalesce since the electrostatic repulsion responsible for a significant portion of the emulsion's stability has been eliminated. Eventually large floc formation or liquid oil formation occurs. Once the droplets begin to flocculate they can be begin to float since they are much larger than the starting oil droplets. As they grow in size they will rise to the surface of the water at a faster rate. If a high molecular weight cationic polymer is used for charge neutralization, the polymer will accelerate the separation of the oil since the polymer is attracted to the oil droplet by coulombic attraction, hydrogen bonding or other mechanisms. In some cases low molecular weight cationic chemicals are added for charge control and then high molecular weight nonionic or anionic polymers are added next to cause polymer bridging between droplets and accelerate floc formation.

The advantages of the disclosed polymers is related to the fact that they are not only water soluble or dispersible, but also contain small amounts of hydrophobic groups. Not wishing to be bound by any theory, we believe that while conventional polymers can only attach themselves to oil droplets by coulombic attraction, hydrogen bonding or other mechanisms, the hydrophobic groups of these novel terpolymers can also be attached by a hydrophobic group-hydrophobic oil droplet association. While coulombic attraction still appears to be the strongest type of attraction, the hydrophobic association, or hydrophobic effect, appears to add a significant strengthening to this attraction, as evidenced by improved emulsion breaking and waste water clean-up. Indications are that the cationic hydrophobic polymers, prepared by the process of this invention, enable the formation of very strong floc particles. This is based on the observation that, unlike many conventional treatments, the floc particles produced by using the polymers prepared by the process of this invention are very difficult to redisperse. Adsorption of the hydrophobic functionalized water soluble polymer on the surface of the oil droplets is believed to be the cause of this observation. Further details on the use of hydrophobically associating cationic polymers for oily water clean-up treatment can be found in copending application, U.S. Ser. No. 904418, which is incorporated herein by reference.

To evaluate the influence of the polymerization process on the use of these polymers for the removal of emulsified oil from water, about 0.1 to about 200 ppm of the hydrophobically functionalized water soluble cationic polymer were added. After contacting under suitable agitation conditions for a prescribed time period, the emulsified oil droplets and polymer separated under quiescent conditions into a distinct layer from the water. The rate of mixing after polymer addition varied, depending on the type of water being treated, the amount of oil emulsified in the water, temperature and several other conditions. The concentration of oil remaining in the water after treatment with the disclosed polymers was significantly less than the concentration of oil remaining in the water after similar treatment with a similar polymer not containing the novel hydrophobe functionalization. The oil which separated as a distinct layer from the layer of water was separated from the water by conventional methods.

While it is difficult to exactly simulate a process to break oily water emulsions and oil field-produced fluids, commonly referred to as reverse emulsions, it is common practice to make laboratory emulsions using crude oil from an oil production field of interest by high shear-mixing the given crude into water using a Waring blender or homogenizer. The formed oil-in-water can then be diluted with water and other suitable materials to simulate the oil production field being studied. The emulsions thus produced simulate oily waste waters from a given area, but are recognized as being an approximation. One would typically use these laboratory emulsions for testing chemical additives in the laboratory prior to confirmatory testing on the actual system in the field.

A common laboratory test used to simulate a mild water clarification process in the field is what is referred to as the Jar Test. The Jar Test involves putting 500 ml of a laboratory prepared or actual field emulsion into 600 ml clear glass breakers (six at a time). Larger breakers may be used if enough fluid is available. The breakers are then placed on a six paddle Phipps & Bird stirrer and mixed at a high rate, referred to as the fast mix period. Polymer is added at this mixing speed and timing is begun. After a specified amount of time at high speed, the mixing rate is reduced to a much slower rate for another specified amount of time. The breakers are removed from the mixer and allowed to stand for another period of time. Samples of solution are removed from a point near the 250 ml mark on the breakers and tested for turbidity (NTU) using standard test equipment and oil-in-water content using one of several available methods. An example of one of the oil-in-water determinations is to Freon-extract the oil from a waste water and then measure its infrared absorbance relative to a standard. The object of the test is to achieve the lowest NTU or oil level using the smallest amount of polymer. the actual mixing rates and times used in the Jar Test depend on the system being simulated and vary from study to study. The Jar Test, from the experience of many investigators over the years, has been shown to provide a good simulation of field clarification systems.

Another laboratory test commonly used in the current art is the Wemco 1+1 Laboratory Flotation Machine, available from Wemco in Sacramento, Calif. The technique used by the Wemco is also commonly referred to as induced air flotation. The Wemco 1+1 Laboratory Flotation Machine is a small scale pilot unit designed to model the full scale units, built by Wemco, which are commonly used in oil fields and in several other industries for water clarification and oil and solids removal. The laboratory Wemco, from the experience of several investigators over the years, has been found to provide a good simulation of what will occur in the larger unit when it is used in the evaluation of chemical additives. Laboratory prepared or actual field waste waters or emulsions are added to the test bowl of the Wemco mixed for a few seconds with chemical additives without aeration. The air is then turned on and flotation occurs. Samples of the Wemco treated water are then withdrawn from a point near the bottom of the bowl for turbidity and oil-in-water determinations as described above.

The following examples are illustrative of the present invention, but are not in any way a limitation thereof. All parts and percentages are by weight unless otherwise specified.

EXAMPLE I

An oil phase is prepared by mixing 68.1 g. oil, 15.0 g. sorbitan monooleate, and 5.01 g. Hypermer B-246 (linear ABA block copolymer of polyester-polyethylene oxide-polyester prepared by reacting condensed 12-hydroxystearic acid with polyethylene oxide according to the procedure outlined in U.S Pat. No. 4,203,877 and available from Imperial Chemical Industries, Ltd.). The mixture is then heated to 120° F. and mixing is continued until complete dissolution is observed.

A portion of the aqueous phase is prepared by combining under agitation 127.5 g. acrylamide (as a 50% solution) 45.0 g. 3-(methacrylamido)propyl-trimethylammonium chloride (as a 50% solution), 1.8 g. pentasodium diethylenetriamine pentaacetate. This portion is slowly heated to 105°–110° F. In a separate vessel 7.2 g. t-octylacrylamide is added to 25.5 g. methanol with heating to 105° F. and stirring until the t-octylacrylamide is dissolved. The methanol solution is then added to the balance of the aqueous phase while 0.03 g. potassium persulfate is also added thereto. Agitation and heating to a maximum of 115° F. is continued until the solution is clear of any solid precipitation.

The aqueous phase is slowly added into the oil phase, in about one minute with agitation and nitrogen purging. The mixing continues for about 15 minutes with the temperature being held in the 110°–115° F. range throughout. The mixture is then homogenized to about 800 cps. in a Silverson homogenizer to form a water-in-oil emulsion. The emulsion is then transferred to a suitable reaction vessel with stirring and nitrogen sparging while maintaining the temperature at 110°–115° F.

Polymerization is commenced by raising the temperature to 120° F. After the refractive index of the emulsion has increased by at least 0.005 (the zero hour) the reaction is continued at the following temperature/time schedule:

| 120° F. | 2 hours after zero hour |
|---|---|
| 130° F. | 1 hour |
| 140° F. | 1 hour |
| 150° F. | 3 hours plus |

0.7 g. benzoquinone is added in toluene to the oil phase as a radical scavenger when the temperature is increased to 130° F. The reaction is terminated one hour after the refractive index of samples ceases to increase at 150° F. and the reaction has been at 150° F. for at least 3 hours.

To form a single package final product having a total solids content of about 36 weight percent 9 g. polyoxyethylene (20EO) sorbitan monooleate is added slowly (about 40 minutes) and then the emulsion is allowed to cool to room temperature.

Analysis of the resultant polymer shows about 88.2 mole percent acrylamide, 10.6 mole percent MAPTAC, and 1.2 mole percent t-octylacrylamide. The 0.1 weight percent dilute polymer solution viscosity is 3.9 cps and the viscosity of the polymeric emulsion prior to adding the breaker surfactant is 1000 cps. This demonstrates that a high molecular weight polymer is produced with little or no oil phase t-octylacrylamide polymer which would have substantially increased the polymeric emulsion viscosity.

EXAMPLE II

The procedure of Example I is repeated except that the methanol is omitted and the t-octylacrylamide is predissolved in a portion of the acrylamide monomer solution by heating to about 140° F. and thereafter maintaining the temperature of the emulsion above 113° F. until polymerization is complete. A substantially similar polymeric emulsion results.

EXAMPLE III

The procedure of Example I is repeated except that the benzoquinone free radical scavenger is omitted. A substantially similar polymeric emulsion results except that the viscosity of the polymeric emulsion is 1900 cps indicating that some polymerization of t-octylacrylamide occurred in the oil phase.

EXAMPLE IV

The procedure of Example I is repeated except that the Hypermer B-246 is replaced by an equivalent amount of Hypermer B-261 which has a longer polyethylene oxide block thereby giving an HLB value of 7–9 as opposed to 6–8. A substantially similar polymeric emulsion results.

EXAMPLE V

The procedure of Example I is repeated except that the sorbitan monooleate is replaced by an equivalent amount of sorbitan monostearate. A substantially similar polymeric emulsion results.

COMPARATIVE EXAMPLE A

The procedure of Example III is repeated except that a dual initiator system is used. The initiators are an oil soluble azobisisobutyronitrile and a water soluble redox combination of potassium bromate and sodium metabisulfate. The resultant polymeric emulsion has a product viscosity in excess of 13,000 cps. showing substantial oil phase polymerization of the hydrophobe.

COMPARATIVE EXAMPLE B

The procedure of Example I is repeated except that the Hypermer B-246 is replaced by one of the following chemically unrelated polymeric stabilizers:
(a) Hypermer A-409: modified polyester surfactant, HLB 9-11;
(b) Hypermer CG-6: acrylic graft copolymer, HLB 11-12; and
(c) Hypermer E-475: oil soluble emulsifier stabilizer, HLB 5-6.

In each of the attempted subsequent polymerization either the initial emulsion is unstable, or the emulsion breaks down during the polymerization, or the reaction mixture gels. None of these polymeric stabilizers produces a satisfactory polymeric emulsion.

COMPARATIVE EXAMPLE C

The procedure of Example I to prepare the initial monomeric emulsion is repeated with a different surfactant system based upon a combination of sorbitan monooleate (HLB 4.3) and ethoxylated sorbitan monooleate (HLB 15). To determine if these surfactants could provide sufficient emulsion stability to even allow a polymerization to occur, the emulsions are held at 50° C. for 85 minutes in the absence of any initiator and the percent separation determined. The results are:

| % SMO | % Ethox SMO | % Separation |
|-------|-------------|--------------|
| 0.17  | 0           | 40           |
| 0.17  | 0.16        | 40           |
| 0.17  | 0.32        | 62           |
| 0.17  | 0.54        | 64           |
| 0.17  | 0.80        | 64           |
| 0.17  | 1.07        | 64           |
| 0.17  | 1.61        | 65           |

None of the emulsions had sufficient stability.

COMPARATIVE EXAMPLE D

The procedure of Comparative Example C is repeated except that the ethoxylated sorbitan monooleate is omitted and the amount of sorbitan monooleate is varied in an attempt to stabilize the preliminary emulsion solely with the SMO. The emulsion stability after 40 minutes at 50° C. is:

| % of SMO | % Separation |
|----------|--------------|
| 1.9      | 74           |
| 2.3      | 70           |
| 2.6      | 67           |
| 3.1      | 66           |
| 3.5      | 66           |

None of the emulsions are stable.

EXAMPLE VI

The procedure of Comparative Example C is repeated with a surfactant system according to the present invention, i.e. sorbitan monooleate and Hypermer B-246, and the percent separation at 54° C. overnight determined. The results are:

| % SMO | % B-246 | % Separation |
|-------|---------|--------------|
| 1.9   | 0       | 100          |
| 1.9   | 0.037   | 45           |
| 1.9   | 0.069   | 30           |
| 1.9   | 0.091   | 10           |
| 1.9   | 0.12    | 7            |
| 1.9   | 0.14    | 6            |
| 1.9   | 0.17    | 1            |

The emulsions having 10 percent or less separation may be successfully polymerized.

EXAMPLE VII

To determine the effectiveness of polymeric emulsions produced by the present process in cleaning up oil-containing waters WEMCO oily water cleanup tests are conducted with a variety of polymeric emulsions and a variety of oily waters. The polymeric emulsions each have a nominal composition of 89% acrylamide, 10% MAPTAC, and 1% t-octylacrylamide and are prepared and characterized as follows:

(a) Emulsion A—Prepared as in Example I using methanol and heat; 35.6% active polymer; polymer solution viscosity of 1.9 cps (30 RPM LVT/UL); and (b) Emulsion B—Prepared as in Example III using heat only; 39.1% active polymer; polymer solution viscosity of 3.9 cps; and (c) Emulsion C—Prepared as Emulsion B but 1.3% more oil; 34.1% active polymer; polymer solution viscosity of 3.9 cps.

Three different oily water laboratory preparations are evaluated, the oil contents being 19, 59 and 78 ppm.

The percent oil remaining after treatment at various dosage levels is determined to be as follows:

(1) Initial Oil Content - 78 ppm

| Dosage (ppm) | % Residual Oil | |
|--------------|---|---|
|              | A | B |
| none         | 100 | 100 |
| 0.25         | 65  | 63  |
| 0.5          | 40  | 40  |
| 1.0          | 22  | 27  |
| 2.0          | 18  | 30  |

(2) Initial Oil Content - 59 ppm

| Dosage (ppm) | Residual Oil | |
|--------------|---|---|
|              | A | C |
| none         | 100 | 100 |
| 0.25         | 13  | 18  |
| 0.5          | 6   | 11  |
| 1.0          | 5   | 14  |
| 2.0          | 6   | 16  |

(3) Initial Oil Content - 19 ppm

| Dosage (ppm) | % Residual Oil |
|--------------|----------------|
|              | A              |
| none         | 100            |
| 0.25         | 28             |
| 0.5          | 18             |
| 1.0          | 26             |
| 2.0          | 28             |

EXAMPLE VIII

To compare the effectiveness of a polymeric emulsion prepared by the present process vs. commercial polymers currently being used to treat oily waste waters, a plant scale Wemco test under plant operating conditions is performed. The polymers evaluated are:

(a) Jayfloc-812: an inverse emulsion of a low charge density cationic polyacrylamide;

(b) Jayfloc-835: an epipolyamine polymer; and (c) Emulsion D: an inverse emulsion of the present invention containing 88.8 percent acrylamide, 10 percent MAPTAC, and 1.2 percent t-octylacrylamide, prepared as in Example I.

Based upon the results of a series of Wemco tests at the plant with the three different polymers the required treatrate, in quarts per day, is determined is to be as follows:

| (a) | Jayfloc-812 | 17 |
| (b) | Jayfloc-835 | 17 |
| (c) | Emulsion D  | 3  |

Thus the emulsion of the present invention is many times superior to the other polymers which are considered the most effective for treating the water at the particular plant. On a cost/performance basis Emulsion D is found to be five times more efficient than either of the commercial polymers.

In a previous test at the same plant when the upstream water oil level was significantly higher, an inverse emulsion of the present invention was found to be twice as effective as Jayfloc-812 and four times as effective as Jayfloc-835, both on a cost/performance basis.

EXAMPLE IX

The process of Example I is repeated except for varying the monomers being polymerized. The specific monomers and their mole percents in the feed are:

| Sample | Nonionic | Cationic | Oil-Soluble |
|---|---|---|---|
| 1 | Acrylamide-88 | MAPTAC-10 | tOAm-2 |
| 2 | Acrylamide-86 | MAPTAC-10 | tOAm-4 |
| 3 | Acrylamide-84 | MAPTAC-10 | tOAm-6 |
| 4 | Acrylamide-78 | MAPTAC-20 | tOAm-2 |
| 5 | Acrylamide-88 | DMAEMA-10 | tOAm-2 |
| 6 | Acrylamide-87 | METAMS-11 | tOAm-2 |
| 7 | Acrylamide-85 | METAMS-11 | tOAm-4 |
| 8 | Acrylamide-88 | DMDAAC-10 | tOAm-2 |
| 9 | Acrylamide-73.4 | DMDAAC-24.6 | tOAm-2 |
| 10 | Acrylamide-88 | MAPTAC-10 | nOAm-2 |
| 11 | Acrylamide-84 | MAPTAC-10 | nOAm-6 |
| 12 | MethAM-88 | DMAEMA-10 | STMA-2 |
| 13 | MethAM-86 | DMAEMA-10 | STMA-4 |
| 14 | Acrylamide-87 | MAPTAC-10 | BFA-3 |

MethAM is methacrylamide
MAPTAC is 3-methacrylamidopropyltrimethylammonium chloride
DMAEMA is dimethylaminoethylmethacrylate quaternary
METAMS is the dimethylsulfate salt of DMAEMA
DMDAAC is dimethyldiallylammonium chloride
tOAm is t-octylacrylamide
nOAm is n-octylacrylamide
STMA is stearyl methacrylate
BFA is benzyl-2-furanacrylate In each case a stable polymeric emulsion results.
What is claimed is:

1. A process for preparing a polymeric water-in-oil emulsion of a copolymer of a water-soluble monomer and a water-insoluble oil-soluble monomer which comprises:
   (i) forming a uniform aqueous solution of the water soluble monomer and the water-insoluble, oil-soluble monomer, said water-insoluble, oil-soluble monomer being solubilized by pre-dissolving it in a water-miscible, oil-immiscible organic solvent or by heating the water-insoluble, oil-soluble monomer in the presence of at least a portion of the water-soluble monomer and water,
   (ii) forming an oil solution of an inert hydrophobic liquid oil, a surfactant having an HLB value of about 1 to about 5, and oil-soluble, water-insoluble linear ABA block copolymer prepared by reacting condensed 12-hydroxystearic acid with polyethylene oxide, said surfactant and block copolymer being present in sufficient amount to stabilize the emulsion during polymerization;
   (iii) homogenizing the aqueous solution and the oil solution to form a water-in-oil emulsion;
   (iv) deaerating the emulsion;
   (v) incorporating a sufficient amount of a water-soluble, oil-insoluble free radical initiator to effect polymerization; and
   (vi) polymerizing the monomers for a sufficient period of time and at a sufficient temperature to produce a high molecular weight copolymer in the aqueous phase of the water-in-oil emulsion.

2. The process of claim 1 wherein the solvent is an alkyl alcohol having about 1 to about 4 carbon atoms.

3. The process of claim 2 wherein the solvent is selected from the group consisting of methanol and isopropanol.

4. The process of claim 1 wherein the water-insoluble, oil-soluble monomer is solid at room temperature, and along with the water-soluble monomer and water is heated to above its melting point prior to being added to the aqueous phase and thereafter is maintained at a temperature at no lower than about 15° C. below the melting point until the polymerization is completed.

5. The process of claim 1 wherein the pre-dissolved mixture of a water-insoluble oil-soluble monomer, which is solid at room temperature, and the water-miscible oil-immiscible organic solvent or a minor portion of the water-soluble monomer, is heated to above the melting point of the water-insoluble, oil-soluble monomer prior to addition thereof to the balance of the water-soluble monomer, and thereafter maintaining the temperature at no lower than about 15° C. below the melting point of the water-insoluble, oil-soluble monomer until the polymerization is completed.

6. The process of claim 1 wherein the surfactant is a sorbitan ester.

7. The process of claim 1 wherein the block copolymer has an HLB value of about 5 to about 9.

8. The process of claim 1 wherein the surfactant is present in an amount about about 2 to about 8 weight percent of the total emulsion.

9. The process of claim 1 wherein the block copolymer is present in an amount of about 0.5 to about 3 weight percent of the total emulsion.

10. The process of claim 1 wherein the surfactant and the block copolymer are used in a proportion of about 1:1 to about 5:1.

11. The process of claim 1 wherein the initiator is incorporated into the uniform aqueous solution prior to homogenization.

12. The process of claim 1 wherein an oil-soluble radical scavenger is added to the oil solution.

13. The process of claim 1 wherein an oil-soluble radical scavenger is added to the water-in-oil emulsion after polymerization has commenced and before polymerization is completed.

14. The process of claim 1 wherein the temperature is about 20 to about 100° C.

15. The process of claim 1 wherein the temperature is about 40 to about 75° C.

16. The process of claim 1 further comprising, after completion of the polymerization, incorporating a breaker surfactant capable of inverting the emulsion to an oil-in-water emulsion upon contact with water to form a single package self-inverting emulsion.

17. The process of claim 1 wherein the water soluble monomer is a nonionic monomer.

18. The process of claim 17 wherein the nonionic monomer comprises acrylamide.

19. The process of claim 1 wherein the water soluble monomer comprises a mixture of a nonionic monomer and a cationic monomer.

20. The process of claim 19 wherein the nonionic monomer comprises acrylamide and the cationic monomer comprises 3-methacrylamidopropyl-trimethylammonium chloride.

21. The process of claim 1 wherein the copolymer produced is represented by the formula:

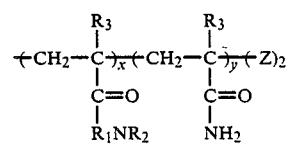

wherein $R_1$ is a $C_4$ to $C_{30}$ linear or branched alkyl, alkylcycloalkyl or alkylaryl group; $R_2$ is the same or different group as $R_1$, or hydrogen or $C_1$ to $C_3$ linear or branched alkyl group; $R_3$ is hydrogen or methyl; and Z is an ammonium cation monomer, wherein x, y, and z are mole percents, x ranging from 0.1 to 20 mole percent, y from 0 to 94.9 mole percent,, and z from 5 to 99.9 mole percent, the cation monomer, z, being selected from the group consisting of ammoniumalkyl(meth)acrylamides, ammoniumalkyl(meth)acrylates, and diallyl dialkyl ammonium salts.

22. The process of claim 1 wherein the copolymer produced is represented by the formula:

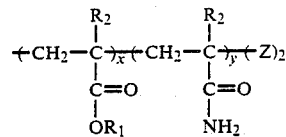

wherein $R_1$ is a $C_4$ to $C_{30}$ linear or branched alkyl, alkylcycloalkyl or alkylaryl group; $R_2$ is hydrogen or methyl; and Z is an ammonium cation monomer, wherein x, y, and z are mole percents, x ranging from 0.1 to 20 mole percent, y from 0 to 94.9 mole percent,, and z from 5 to 99.9 mole percent, the cation monomer, z, being selected from the group consisting of ammoniumalkyl(meth)acrylamides, ammoniumalkyl(meth)acrylates, and diallyl dialkyl ammonium salts.

23. The method of claim 21 wherein the ammonium cation monomer is a dially dialkyl ammonium salt.

24. The method of claim 22 wherein the ammonium cation monomer is a diallyl dialkyl ammonium salt.

* * * * *